United States Patent
Ye

(10) Patent No.: US 7,949,013 B2
(45) Date of Patent: May 24, 2011

(54) WIRELESS COMMUNICATION SYSTEMS AND METHODS USING FLEXIBLE LENGTH INDICATORS

(75) Inventor: Shiang-Rung Ye, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 120 days.

(21) Appl. No.: 12/197,903

(22) Filed: Aug. 25, 2008

(65) Prior Publication Data

US 2009/0086853 A1   Apr. 2, 2009

Related U.S. Application Data

(60) Provisional application No. 60/976,375, filed on Sep. 28, 2007.

(51) Int. Cl.
*H04J 3/24* (2006.01)
(52) U.S. Cl. .................................................... 370/474
(58) Field of Classification Search .............. 370/328, 370/470–474
See application file for complete search history.

(56) References Cited

U.S. PATENT DOCUMENTS

| | | | |
|---|---|---|---|
| 6,788,944 B2 * | 9/2004 | Jiang | 455/450 |
| 6,956,870 B1 | 10/2005 | Charriere et al. | |
| 6,961,349 B2 * | 11/2005 | Malomsoky et al. | 370/469 |
| 7,295,573 B2 | 11/2007 | Yi et al. | |
| 7,411,979 B2 * | 8/2008 | Jiang | 370/469 |
| 7,646,791 B2 * | 1/2010 | Jiang | 370/474 |
| 2007/0047582 A1 | 3/2007 | Malkamaki et al. | |

OTHER PUBLICATIONS

3G TS 25.322 V3.1.2, RLC Protocol Specification, 120 pages, 2000.*

* cited by examiner

*Primary Examiner* — Frank Duong
(74) *Attorney, Agent, or Firm* — Finnegan, Henderson, Farabow, Garrett & Dunner, LLP

(57) ABSTRACT

A wireless communication device includes a data receiving interface, a data processing device coupled with the data receiving interface, and a processing device coupled with the data receiving interface. The data receiving interface is configured to receive a first sub-group and a second sub-group of data for transmission. The first sub-group of data includes data contents for providing at least a portion of a first service, and the second sub-group of data includes data contents for providing at least a portion of a second service. The data processing device is configured to combine the first sub-group of data and the second sub-group of data as a portion of a data transmission group. The processing device is configured to provide a size of a first length indicator based at least on a size of the data transmission group. The first length indicator is configured to indicate a size of the first sub-group of data. The processing device is also configured to provide a size of a second length indicator based on one or more numbers or considerations, such as (a) the size of the first length indicator; (b) the size of the first sub-group of data; (c) the size of the data transmission group; and (d) the size of a header section. The second length indicator is configured to indicate the size of the second sub-group of data.

26 Claims, 14 Drawing Sheets

| Field Length (bits) | 10 | 8 | 7 | 5 |
|---|---|---|---|---|
| | $512 = 2^9$ | $128 = 2^6$ | $64 = 2^5$ | 32 |

FIG. 5A

| Field Length (bits) | 10 | 10 | 7 | 5 |
|---|---|---|---|---|
| | $128 = 2^6$ | $512 = 2^9$ | $64 = 2^5$ | 32 |

FIG. 5B

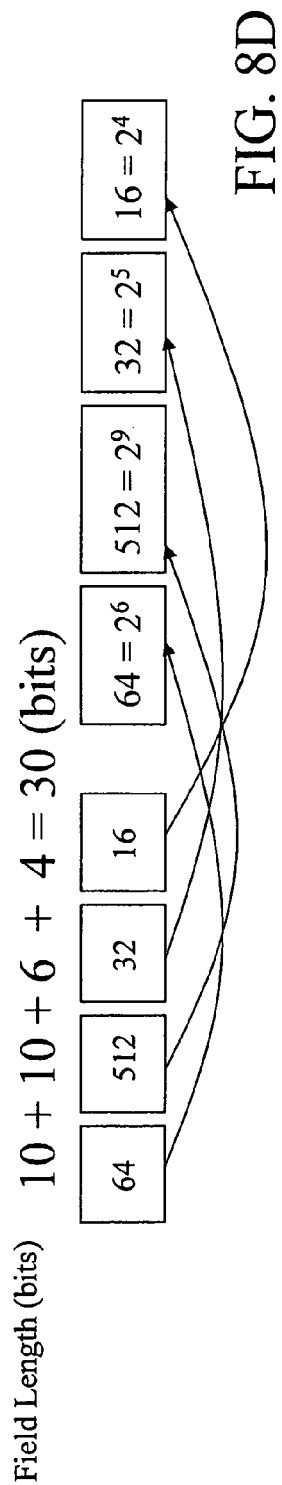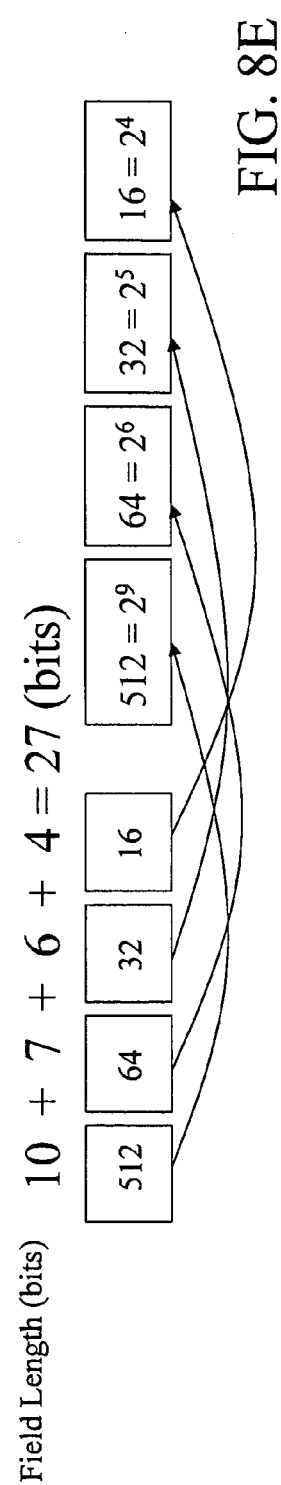

WIRELESS COMMUNICATION SYSTEMS AND METHODS USING FLEXIBLE LENGTH INDICATORS

PRIORITY

The present invention claims the benefit of U.S. Provisional Application No. 60/976,375 filed Sep. 28, 2007 and titled "SYSTEM USING FLEXIBLE-LENGTH INDICATORS AND METHOD OF IDENTIFYING THE LENGTH OF THE FLEXIBLE-LENGTH INDICATORS."

TECHNICAL FIELD

The present disclosure relates generally to wireless telecommunications and, more particularly, to systems and methods using flexible-length indicators.

BACKGROUND

The development of wireless communication and data transmission structures allows two stations to transmit two or more separate streams or sections of data with a single transmission unit. In some applications, the two separate streams or sections may be considered as two separate "services," such as voice communication, a section of video stream, a section of data file, text, or e-mail, or a section of an audio stream, etc. A transmission unit that is self-contained or consecutive in time may be considered as a protocol data unit, a unit that may be defined or governed by transmission protocols. In other words, various wireless communication mechanisms may allow one station to transmit or communicate two or more service data units (SDUs) within a single protocol data unit (PDU).

In an exemplary wireless communication system, a mobile station may multiplex multiple service data units (SDUs) into a protocol data unit (PDU) before transmitting the PDU. To facilitate de-multiplexing of the PDU at a receiving station, each of the SDUs in the PDU may include a length indicator for indicating the length of the corresponding SDU. The SDU length indicators usually have a predetermined, fixed length that does not vary from one to another. The design offers a length of the indicator that is large enough to support the longest SDU of all of the transmissions. Although easy to implement, the length indicators occupy spaces that may be otherwise available for transmissions of data content and may require certain signaling overhead.

Using an example for illustration, the length of an i-th length indicator may be expressed as:

$I_i = M$, for i=1 to n, n being a natural number, wherein $I_i$ is the length of the i-th indicator in a PDU having a number of "n" SDUs, and "M" is a predetermined, fix length, which can be represented in the number of bits.

As an alternative technique, the length indicators may have their lengths dependent on the size of a PDU. Accordingly, the length of an j-th length indicator may be:

$I_j = \lceil \log_2 B \rceil$, for j=1 to n, n being a natural number, wherein $I_j$ is the length of the j-th indicator in a PDU having a number of "n" SDUs, and "B" is the size of the PDU in bits.

Certain conventional designs may require signaling overhead due to the transmission space or resource needed for some indicators, such as the indicators for the SDUs illustrated here or other indicators. It may be desirable to have alternative designs that may be suitable for some applications or may overcome or be configured to overcome one or more disadvantages associated with some conventional designs.

SUMMARY OF THE INVENTION

In one exemplary embodiment, as shown in FIG. 1C, the present disclosure is directed to a wireless communication device 2. The wireless communication device 2 includes a data receiving interface 4, a data processing device 6 coupled with the data receiving interface, and a processing device 8 coupled with the data receiving interface. The data receiving interface 4 is configured to receive a first sub-group and a second sub-group of data for transmission. The first sub-group of data includes data contents for providing at least a portion of a first service, and the second sub-group of data includes data contents for providing at least a portion of a second service. The data processing device 6 is configured to combine the first sub-group of data and the second sub-group of data as a portion of a data transmission group. The processing device 8 is configured to provide the size of a first length indicator based at least on the size of the data transmission group. The first length indicator is configured to indicate the size of the first sub-group of data. The processing device 8 is also configured to provide the size of a second length indicator based on one or more of (a) the size of the first length indicator; (b) the size of the first sub-group of data; (c) the size of the data transmission group; and (d) the size of a header section. The second length indicator is configured to indicate the size of the second sub-group of data.

In another exemplary embodiment, the present disclosure is directed to a set of instructions recognizable by a wireless communication device. The instructions are processed by the device to perform, in no particular order, the steps of: (a) receiving a first sub-group of data for transmission, the first sub-group of data including data contents for providing at least a portion of a first service; (b) receiving a second sub-group of data for transmission, the second sub-group of data including data contents for providing at least a portion of a second service; (c) combining the first sub-group of data and the second sub-group of data as a portion of a data transmission group; (d) providing the size of a first length indicator based at least on the size of the data transmission group, the first length indicator being configured to indicate the size of the first sub-group of data; and (e) providing the size of a second length indicator based on one or more of (1) the size of the first length indicator; (2) the size of the first sub-group of data; (3) the size of the data transmission group; and (4) the size of a header section, the second length indicator being configured to indicate the size of the second sub-group of data.

In another exemplary embodiment, the present disclosure is directed to a method of operating a wireless communication device. The method includes, in no particular order, the steps of: (a) receiving at least two sub-groups of data for transmission, the at least two sub-groups of data including data contents for providing at least portions of data for at least a first service and a second service; (b) combining the at least two sub-groups of data as a portion of the data transmission group; (c) providing the size of a first length indicator based at least on the size of the data transmission group, the first length indicator being configured to indicate the size of a first sub-group of data; and (d) providing the size of a second length indicator based on one or more of (1) the size of the first length indicator; (2) the size of the first sub-group of data; (3) the size of the data transmission group; and (4) the size of a header section, the second length indicator being configured to indicate the size of a second sub-group of data.

BRIEF DESCRIPTION OF THE DRAWINGS

FIGS. 5A and 5B are exemplary diagrams illustrating examples of field lengths identified with several data units, consistent with certain disclosed embodiments;

FIGS. 8A to 8E are exemplary diagrams illustrating a comparison example between a conventional design and various designs consistent with certain disclosed embodiments.

DETAILED DESCRIPTION

Figure 1A:
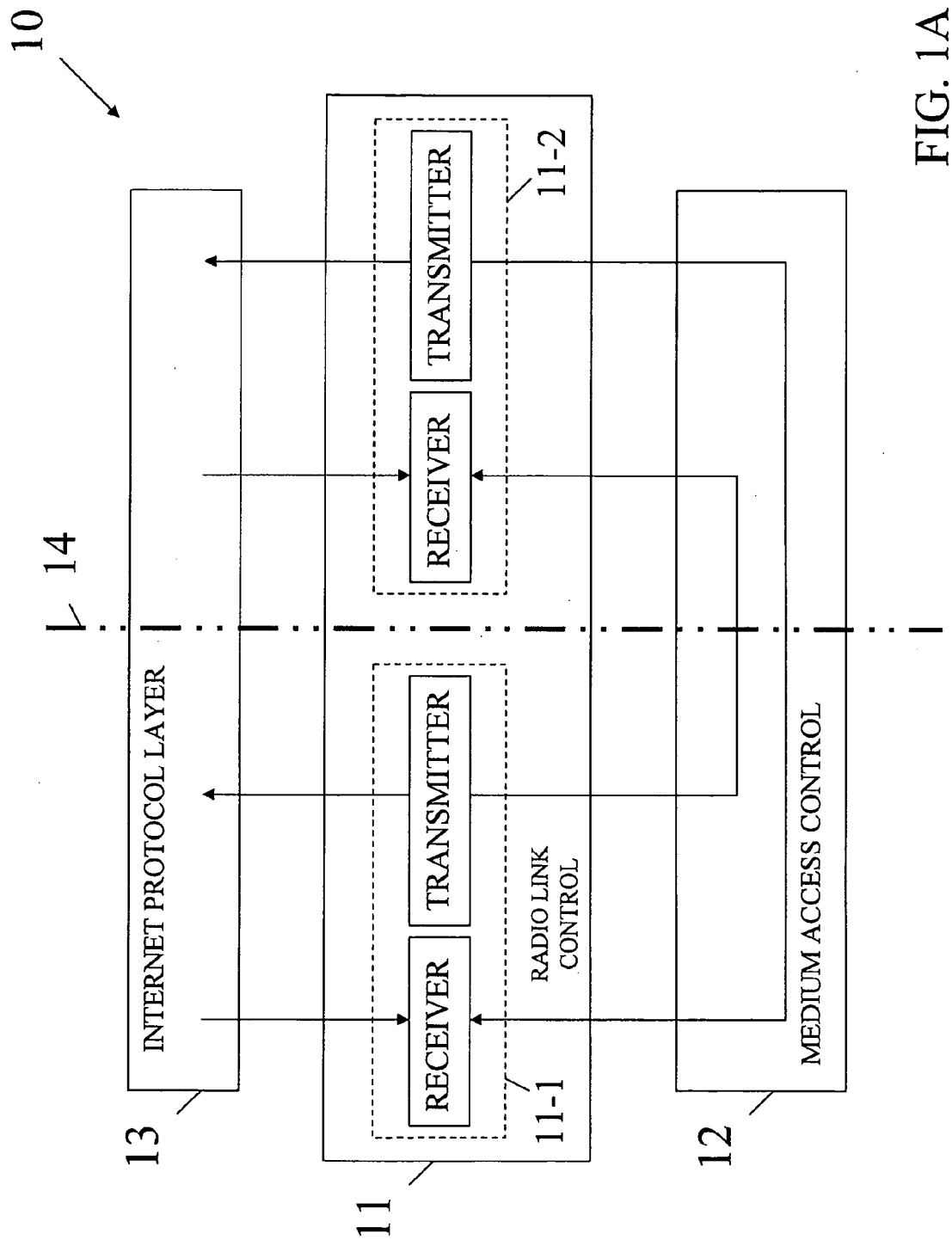
FIG. 1A is an exemplary schematic block diagram illustrating different layers of communication, consistent with certain disclosed embodiments.

FIG. 1A is an exemplary schematic block diagram illustrating different layers of communications, consistent with certain disclosed embodiments. Referring to FIG. 1A, the various layers of wireless communications may include a control or radio link control (RLC) layer 11, and a medium access control (MAC) layer 12 below the control layer 11 and an internet protocol (IP) layer 13 above the control layer 11. Referring to FIG. 1A, RLC layer 11 may include a first RLC entity 11-1 and a second RLC entity 11-2, each of which may further include a receiver and a transmitter and may communicate with each other via interface 14. In one embodiment, MAC layer 12 may control the access to a transmission medium, such as a wireless communication channel. For example, MAC layer 12 may be configured for mapping to or between logical channels and transport channels. As another example, MAC layer 12 may manage the priority and schedule of data transmission. The IP layer may communicate or interface with a processing device coupled to it based on a specific protocol, such as Internet Protocol.

In a communication system, a data transmission group that can be transmitted consecutively may include a certain amount or a predetermined maximum amount of data. In one embodiment, one data transmission group may be considered as a protocol data unit (PDU) in one embodiment. One data transmission group may offer data contents for one or more services, such as voice, data, video, e-mail, and audio services. The data sections for different services may be considered as a service data unit (SDU) in one embodiment. Therefore, a PDU may include one or more SDUs for one or more services provided to a mobile user.

Referring again to FIG. 1A, RLC layer 11 may transmit RLC protocol data units (PDUs) to or receive RLC PDUs from MAC layer 12. In one embodiment, the first RLC entity 11-1 may include a mobile user equipment unit configured to communicate in a wireless system, such as a mobile radio system, via a radio access network (RAN) to one or more core networks. The first RLC entity 11-1 may include a mobile station such as a cellular phone, a personal digital assistant (PDA) and a laptop with mobile communication capabilities. Any of these devices may communicate video, audio, text, data, or any combination of them with the RAN. The second RLC entity 11-2 may include a base station capable of communicating with mobile station 11-1 over interface 14 within a transmission range (cell area) of base station 11-2.

The RAN in one embodiment may include a Universal Mobile Telecommunications (UMTS) Terrestrial Radio Access Network (UTRAN). A UMTS is a third-generation system built upon a radio access technology known as Global System for Mobile communications (GSM). A project known as the Third-Generation Partnership Project (3GPP) has been undertaken to further develop the implementations or protocols of UTRAN and Global System for Mobile communications (GSM)-based radio access network technologies. In a Universal Mobile Telecommunications System (UMTS), RLC layer 11 may be somewhere between IP layer 13 and MAC layer 12. In one embodiment, MAC layer 12 may serve as a "lower layer" relative to RLC layer 11, while IP layer 13 may serve as an "upper layer."

Figure 1B:
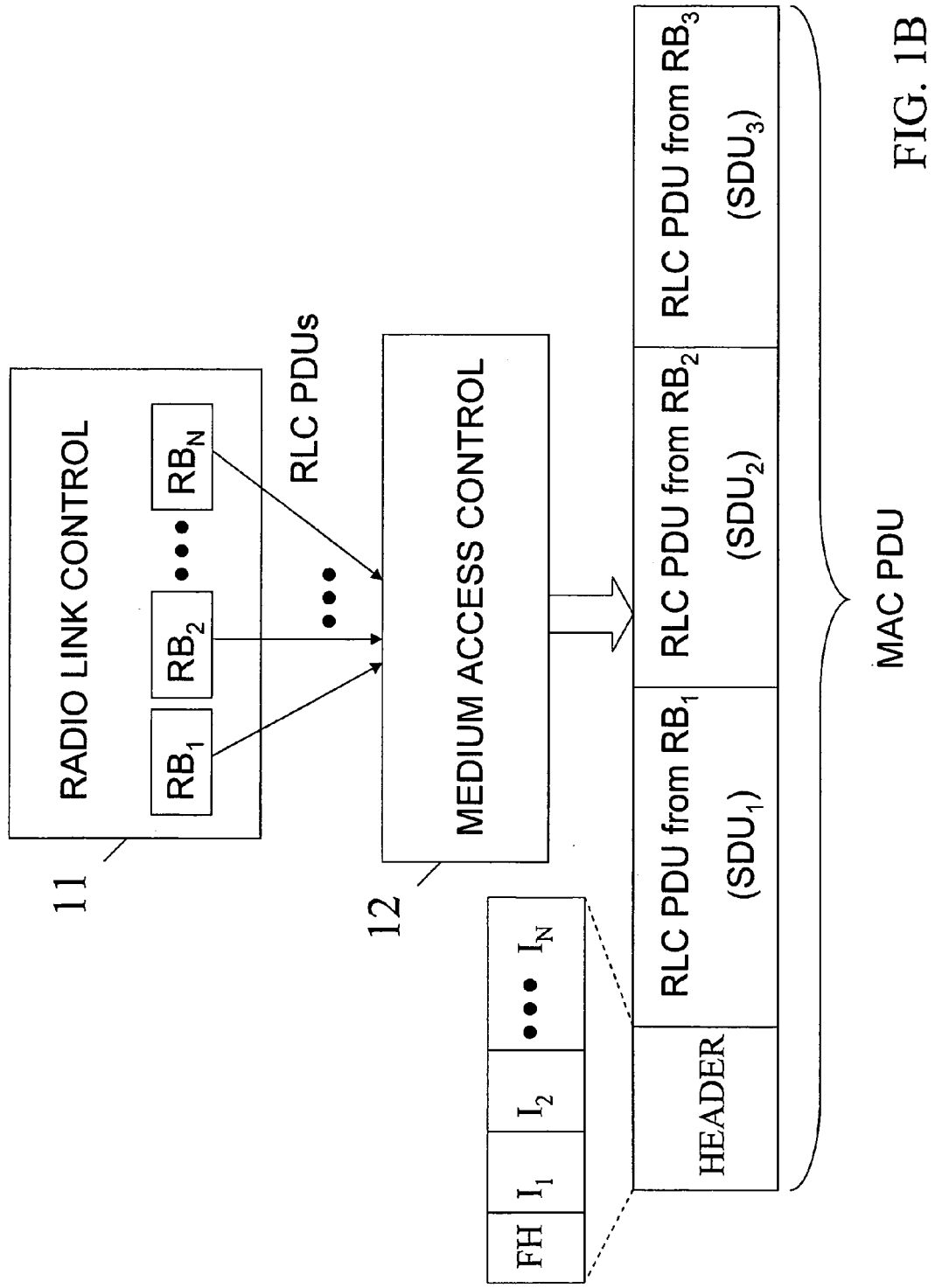
FIG. 1B is an exemplary schematic block diagram illustrating a MAC protocol data unit (PDU), consistent with certain disclosed embodiments.
Figure 1C:
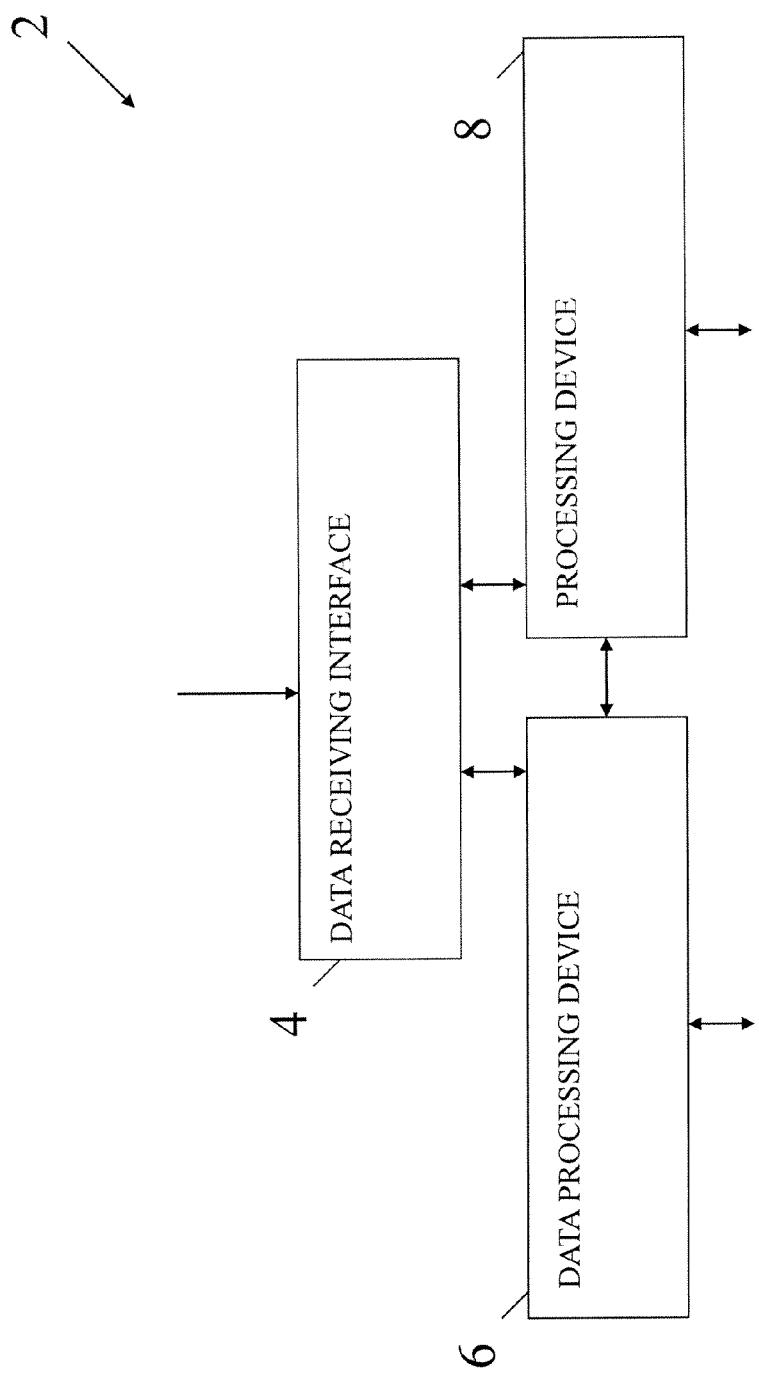
FIG. 1C is an exemplary schematic block diagram illustrating a wireless communication device, consistent with certain disclosed embodiments.

FIG. 1B is an exemplary schematic block diagram illustrating MAC protocol data unit (PDU), consistent with certain disclosed embodiments. Referring to FIG. 1B, MAC layer 12 may receive one or more RLC PDUs from one or more radio bearers, such as $RB_1$, $RB_2$, $RB_3$, etc., at RLC layer 11. A radio bearer (RB) may refer to the transmission service of user data provided from a user device or mobile device level and may allow the transmission of two or more service streams at the same time, such as providing parallel services of text or e-mail and video. When two or more sets of data for two or more services are involved, MAC layer 12 may multiplex one, two, or more RLC PDUs into a MAC PDU, which in turn may include a header and the one or more RLC PDU.

In one embodiment, the MAC PDU may include a first RLC PDU from $RB_1$, a second RLC PDU from $RB_2$ and a third RLC PDU from $RB_3$. Each of the first, second and third RLC PDUs in the MAC PDU may also be called a MAC service data unit (SDU) and may have different sizes. To facilitate demultiplexing of the MAC PDU at a receiving end of the data, such as a receiver, the MAC PDU may contain one or more length indicators in its header, which may indicate the size(s) of one or more MAC SDUs. For example, the header may include a fixed-length portion denoted as "FH" and a variable-length portion comprising length indicators $I_1$ to $I_N$. In one embodiment, the receiver might not have the field length of the one or more length indicators before the receiver receives the data. Once the field length of one or more length indicators is available, the value of the length indicator and in turn the size of a corresponding SDU may be identified.

Figure 2A:
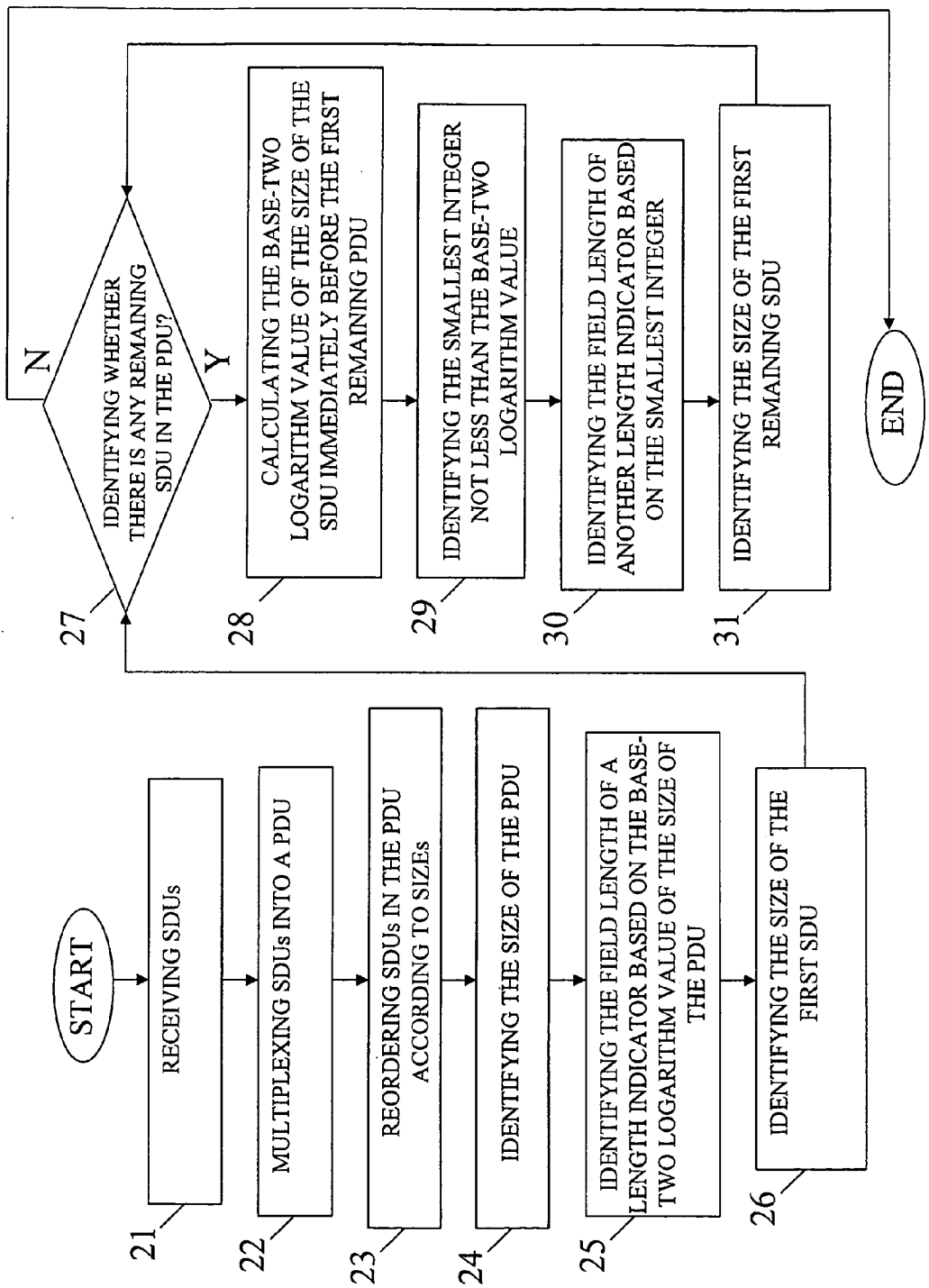
FIG. 2A is an exemplary flow chart illustrating a method of identifying the length(s) of length indicators, consistent with certain disclosed embodiments.

FIG. 2A is an exemplary flow chart illustrating another method of identifying the length(s) of length indicators, consistent with certain disclosed embodiments. Referring to FIG. 2A, at step 21, one or more first PDUs from a first layer may be received at a transmitter side and at a second layer. The first layer may be a higher layer relative to the second layer in a radio interface architecture. At step 22, the first PDU(s) may be multiplexed into a second PDU. The PDUs at the first layer may be known as "first PDUs," and the PDUs at the second layer may be known as "second PDUs." For ease of reference, the first PDUs may be known or named as service data units (SDUs), and the second PDUs may be known or named simply as PDU for the illustration below. At step 23, the SDUs may be reordered according to their sizes.

At a receiver side, the size of the PDU may be identified at step 24. In one embodiment, the size of the PDU may be given by the second RLC entity or base station 11-2, such as the examples described and illustrated in connection with FIG. 1A. At step 25, the field length of a length indicator may be identified based on:

$$I_1 = \lceil \log_2 B \rceil,$$

wherein $I_1$ represents the field length of the first length indicator, "B" represents the size of the PDU, and $\lceil X \rceil$ represents a ceiling function of X and, for all real numbers X, the function returns the smallest integer not less than X. That is $$\lceil X \rceil = \min\{n \in Z | X \leq n\}$$

At step 26, when the field length of the length indicator is available, the size of the first SDU that corresponds to the length indicator may be identified. At step 27, it may be checked to see if there is any remaining SDU in the PDU. If there is, a base-two logarithm value of the size of the SDU immediately before the remaining or unidentified SDUs may be calculated at step 28. The smallest integer not less than the base-two logarithm value may be identified at step 29. At step 30, the field length of another length indicator may be identified using the smallest integer. Steps 28 to 30 may be expressed in an equation below.

$$I_i = \lceil \log_2 V_{i-1} \rceil, \text{ for } i \geq 2, i \text{ being an integer,}$$

wherein $I_i$ represents the field length of another, or i-th, length indicator, and "$V_{i-1}$" represents the size of the one SDU immediately before the remaining SDU(s).

At step 31, when the field length of the length indicator is available, the size of the first remaining SDU that corresponds to the current length indicator may be identified. Steps 27 to 31 may be repeated until all of the SDU(s) in the PDU are identified in size.

Figure 2B:
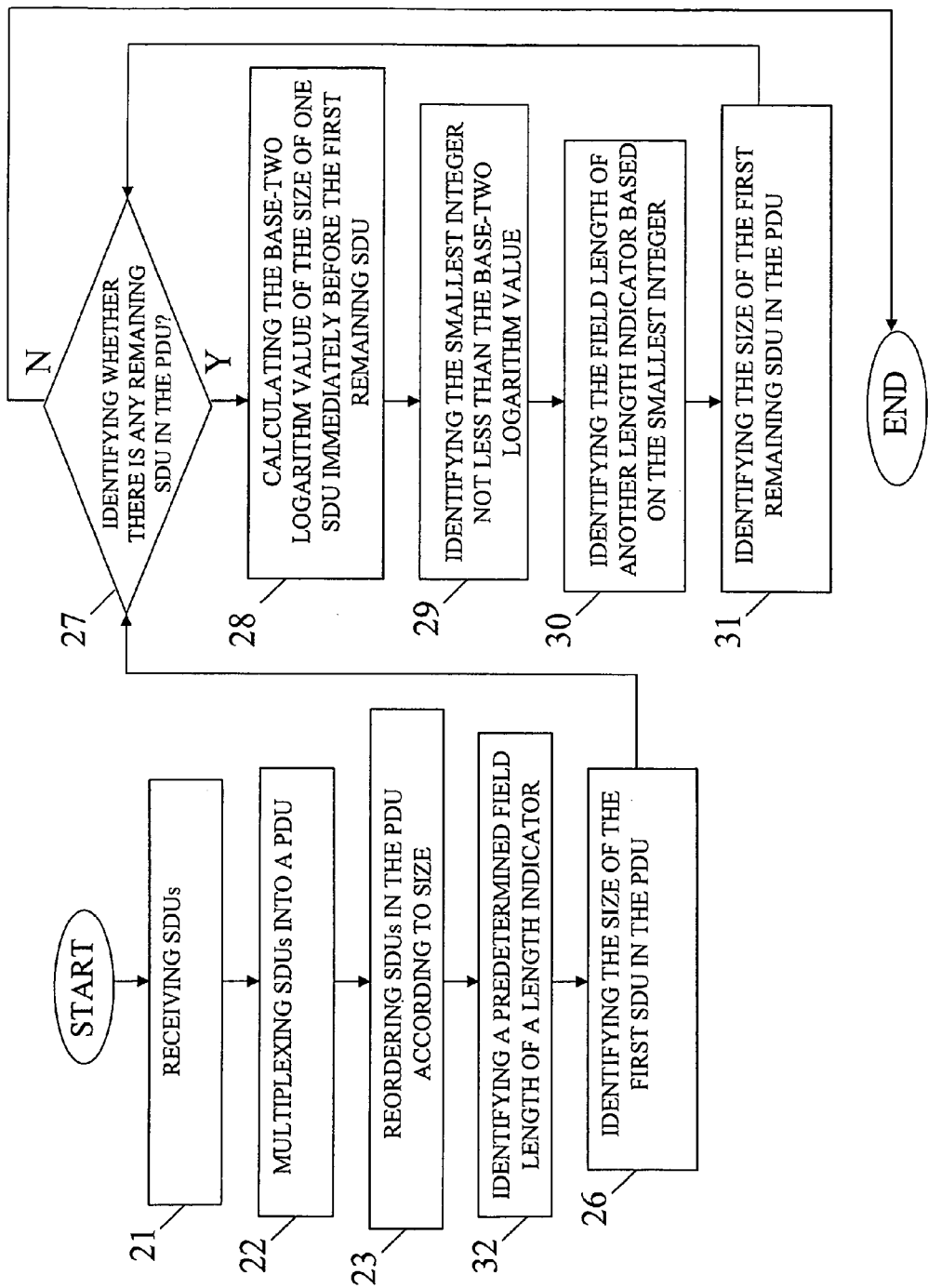
FIG. 2B is an exemplary flow chart illustrating another method of identifying the length(s) of length indicators, consistent with certain disclosed embodiments.

FIG. 2B is an exemplary flow chart illustrating another method of identifying the length(s) of length indicators, consistent with certain disclosed embodiments. Referring to FIG. 2B, the method may be similar to the one illustrated in connection with FIG. 2A. In one embodiment, steps 24 and 25 in FIG. 2A may be omitted, and step 32 may be included. Specifically, after reordering the SDUs according to their sizes at step 23, a predetermined field length of a length indicator may be identified at step 32. The predetermined field length may be able to support the SDU that is the largest in size. When the field length of the length indicator is available, the size of a first SDU that corresponds to the length indicator may be identified at step 26.

Figure 2C:
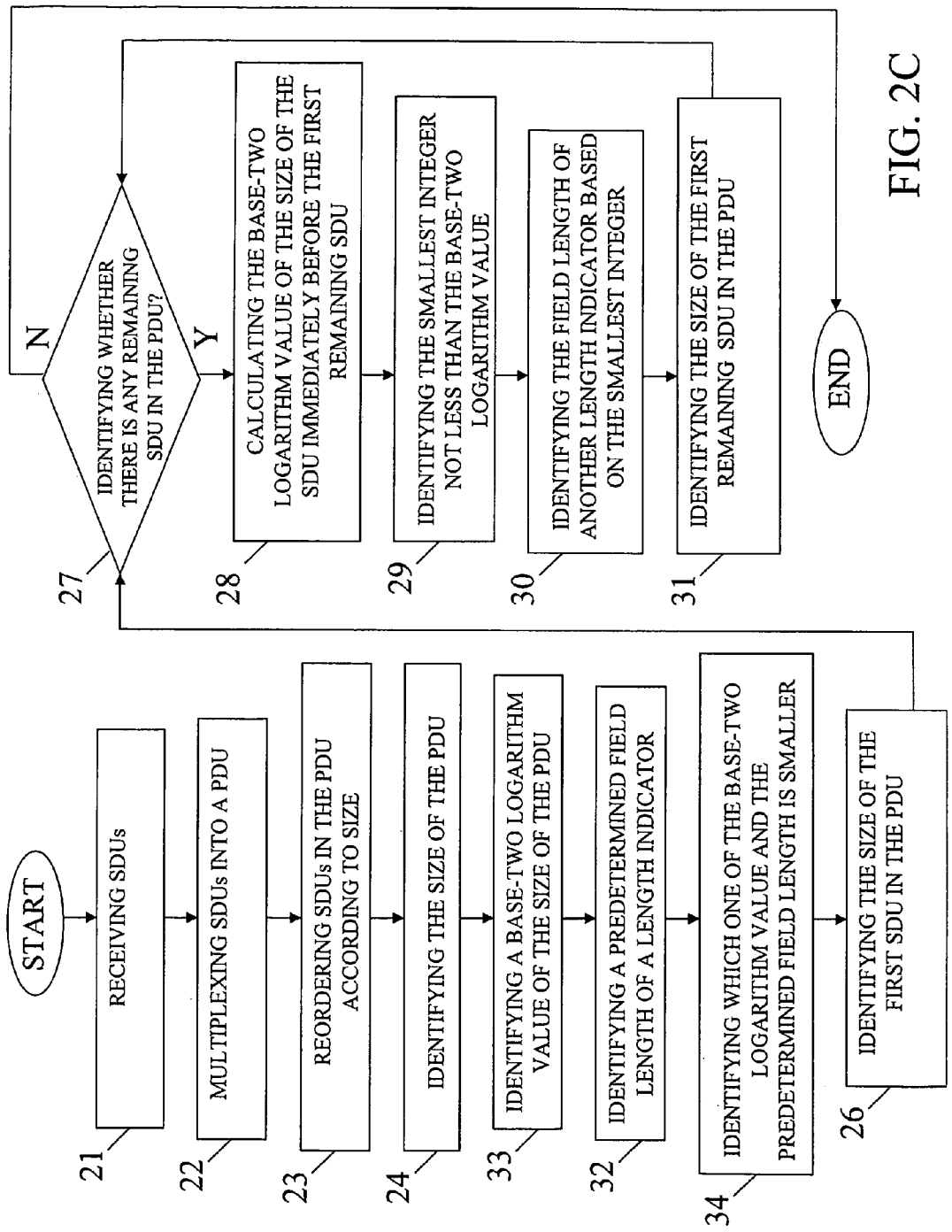
FIG. 2C is an exemplary flow chart illustrating another method of identifying the length(s) of length indicators, consistent with certain disclosed embodiments.

FIG. 2C is an exemplary flow chart illustrating another method of identifying the length(s) of length indicators, consistent with certain disclosed embodiments. Referring to FIG. 2C, the method may be similar to that illustrated in FIG. 2A. In one embodiment, steps 33, 32 and 34 may be added. Specifically, after identifying the size of the PDU at step 24, a base-two logarithm value of the size of the PDU may be identified at step 33. Next, a predetermined field length of a length indicator may be identified at step 32. The predetermined field length may be large enough to support the SDU that is the largest in size. At step 34, the smaller one of the base-two logarithm value and the predetermined field length "M" may be identified by, for example, an equation given below.

$$I_1 = \min(\lceil \log_2 B \rceil, M)$$

or $I_1 = \min(\lceil \log_2 (B-FH) \rceil, M)$

When the field length of the length indicator is available, the size of the first SDU that corresponds to the length indicator may be identified at step 26.

Figure 3A:
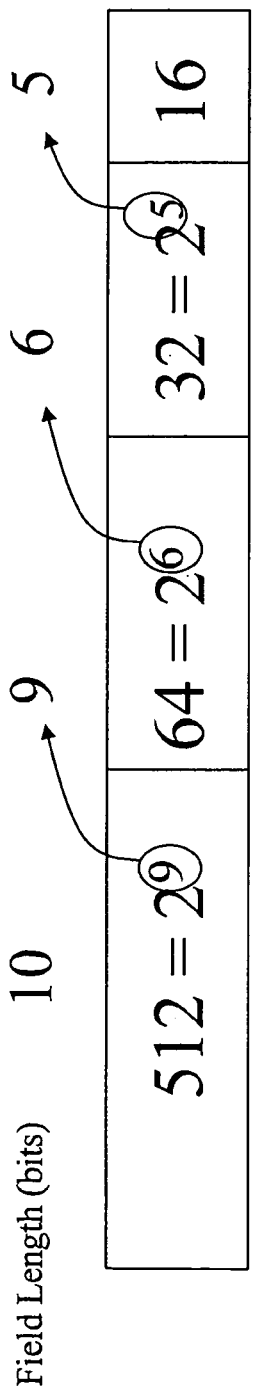
FIGS. 3A and 3B are exemplary diagrams illustrating examples of field lengths identified with several data units, consistent with certain disclosed embodiments.
Figure 3B:
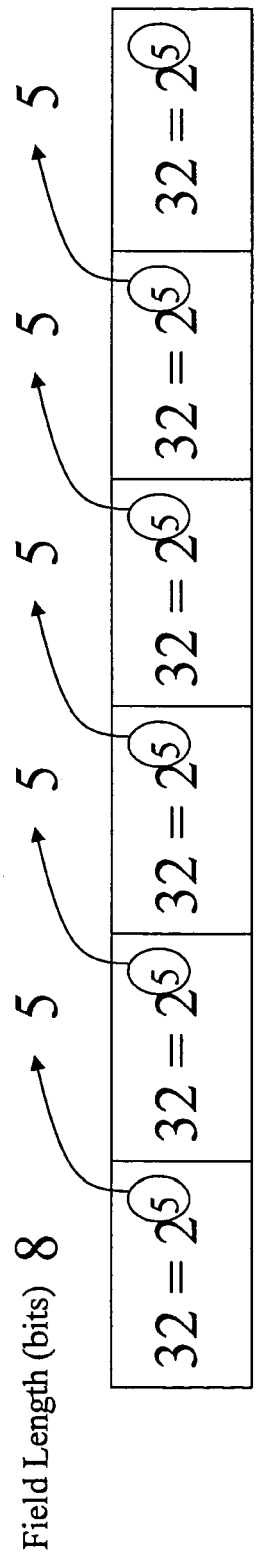

FIGS. 3A and 3B are exemplary diagrams illustrating field lengths identified by the methods illustrated in FIGS. 2A and 2B. In one embodiment, the PDU size "B" may be 1024 bytes, and the predetermined field length "M" may be 8 bits. Referring to FIG. 3A, according to the method of FIG. 2A, the SDUs may be re-ordered based on their sizes. The field length of a first length indicator for the first SDU, after the SDUs are reordered, is $\lceil \log_2 1024 \rceil = 10$. When the field length of the first length indicator is available, the value of the first length indicator at the transmitter side may be identified, i.e., 512, which is the size (512 bytes) of the first SDU in the PDU. Next, the field length of a second length indicator may be identified by the base-two logarithm value of the first SDU, which equals $\lceil \log_2 512 \rceil = 9$. When the field length of the second length indicator is available, the value of the second length indicator may be identified, i.e., 64, which is the size (64 bytes) of the second SDU in the PDU. Similarly, the field lengths of the third and fourth length indicators and in turn the sizes of the third and fourth SDUs may be identified at the receiver side.

For simplicity in illustration, the values of the SDUs in one embodiment are assumed to be the exact power of two (2). In various applications, the SDUs may be any other positive numbers. For example, if the field length of the second length indicator remains unchanged, i.e., 9, the possible value of the first SDU may range from 257 to 512.

Referring to FIG. 3B, according to the method of FIG. 2B, the field length of a first length indicator for the first PDU of reordered PDUs is "M"=8. When the field length of the first length indicator is available, the value of the first length indicator may be identified, i.e., 32, which is the size (32 bytes) of the first SDU in the PDU. Next, the field length of a second length indicator may be identified by the base-two logarithm value of the first SDU, which equals $\lceil \log_2 32 \rceil = 5$. When the field length of the second length indicator is available, the value of the second length indicator may be identified, i.e. 32, which is the size (32 bytes) of the second SDU in the PDU. Similarly, the field lengths of the subsequent length indicators and in turn the sizes of the subsequent SDUs may be identified at the receiver side.

Figure 4A:
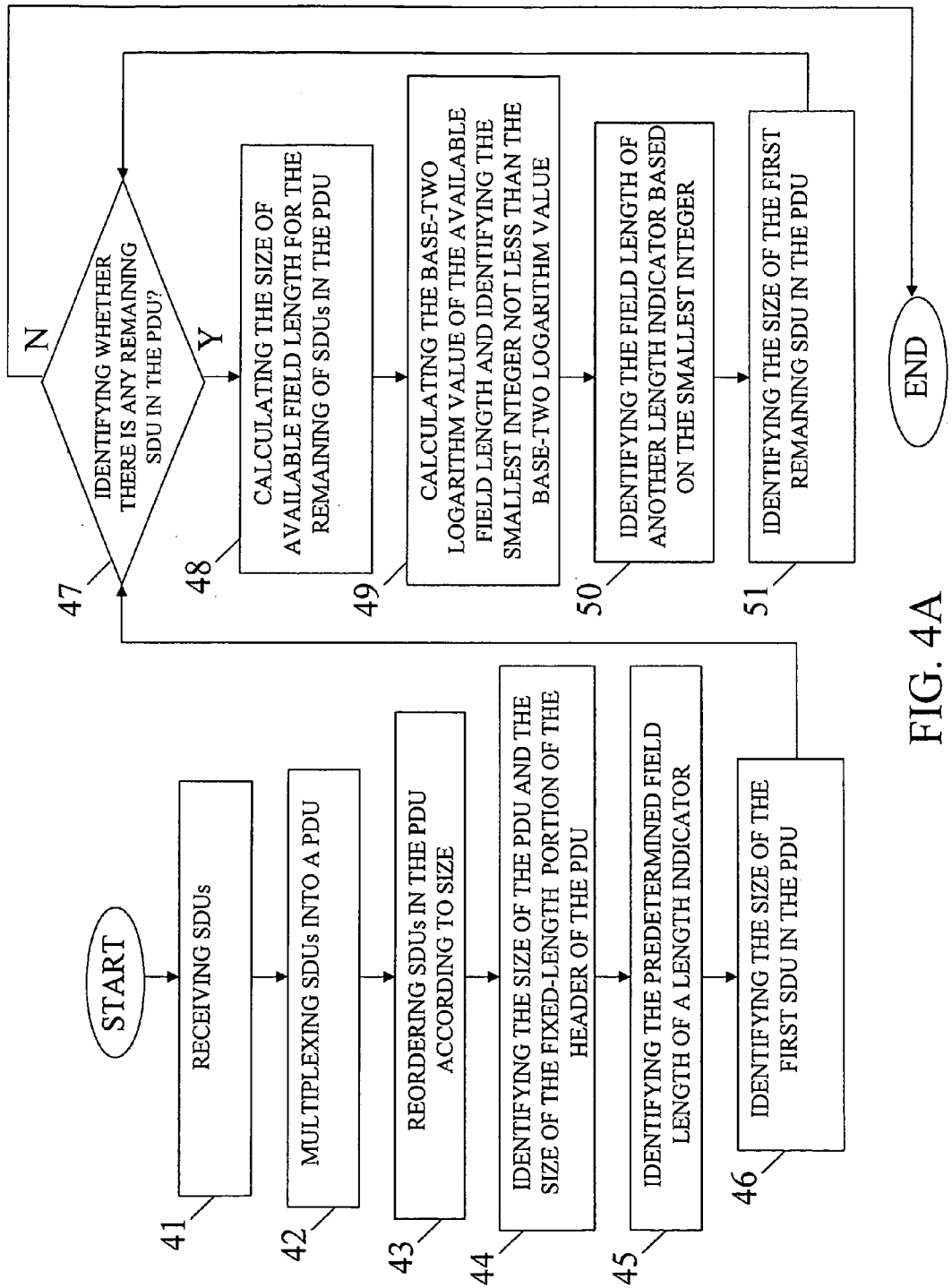
FIG. 4A is an exemplary flow chart illustrating another method of identifying the length(s) of length indicators, consistent with certain disclosed embodiments.

FIG. 4A is an exemplary flow chart illustrating another method of identifying the length(s) of length indicators, consistent with certain disclosed embodiments. Referring to FIG. 4A, at a transmitter side, one or more SDUs (or first protocol data units (PDUs)) may be received at step 41. At step 42, the SDUs may be multiplexed into a PDU (or second PDU). At step 43, the PDUs in the second PDU may be reordered according to their sizes.

Next, at a receiver side, the size of the PDU, denoted as "B", may be identified at step 44. Furthermore, the size of the fixed-length portion of the header, denoted as "FH", of the PDU may be identified. Identification of the sizes of "B" and "FH" may facilitate calculating the size of available field length at step 48. At step 45, which may be optional, the predetermined field length of a length indicator may be identified. The predetermined field length "M" may be large enough to support one of the SDU that is the largest in size. Subsequently, the field length of a length indicator may be identified using one of the values, $\lceil \log_2 B \rceil$, M, min ($\lceil \log_2(B-FH) \rceil$, M) and min ($\lceil \log_2 B \rceil$, M). When the field length of the length indicator is available at step 46, the size of the first SDU that corresponds to the length indicator may be identified.

At step 47, it may be checked to see if there is any remaining SDU in the PDU. If there is, the sizes of available field lengths for the remaining SDUs in the PDU may be identified as:

$$AFL = \left( B - \sum_{j=1}^{i-1}(I_j + V_j) - FH \right),$$

where "AFL" represents the available field length, $I_j$ represents the field length of a j-th length indicator, and $V_j$ represents the value of the j-th length indicator.

Next, at step 49, a base-two logarithm value of "AFL" may be calculated. Furthermore, the smallest integer not less than the base-two logarithm value may be identified. That is, $$I_i = \lceil \log_2 AFL \rceil = \left\lceil \log_2\left( B - \sum_{j=1}^{i-1}(I_j + V_j) - FH \right) \right\rceil,$$

for $i \geq 2$, i being an integer

At step 50, the field length of another length indicator may be identified on the basis of the smallest integer. At step 51, when the field length of the length indicator is available, the size of the first remaining SDU that corresponds to the current length indicator may be identified. Steps 47 to 51 may be repeated until all of the SDUs in the same PDU are identified in size.

Figure 4B:
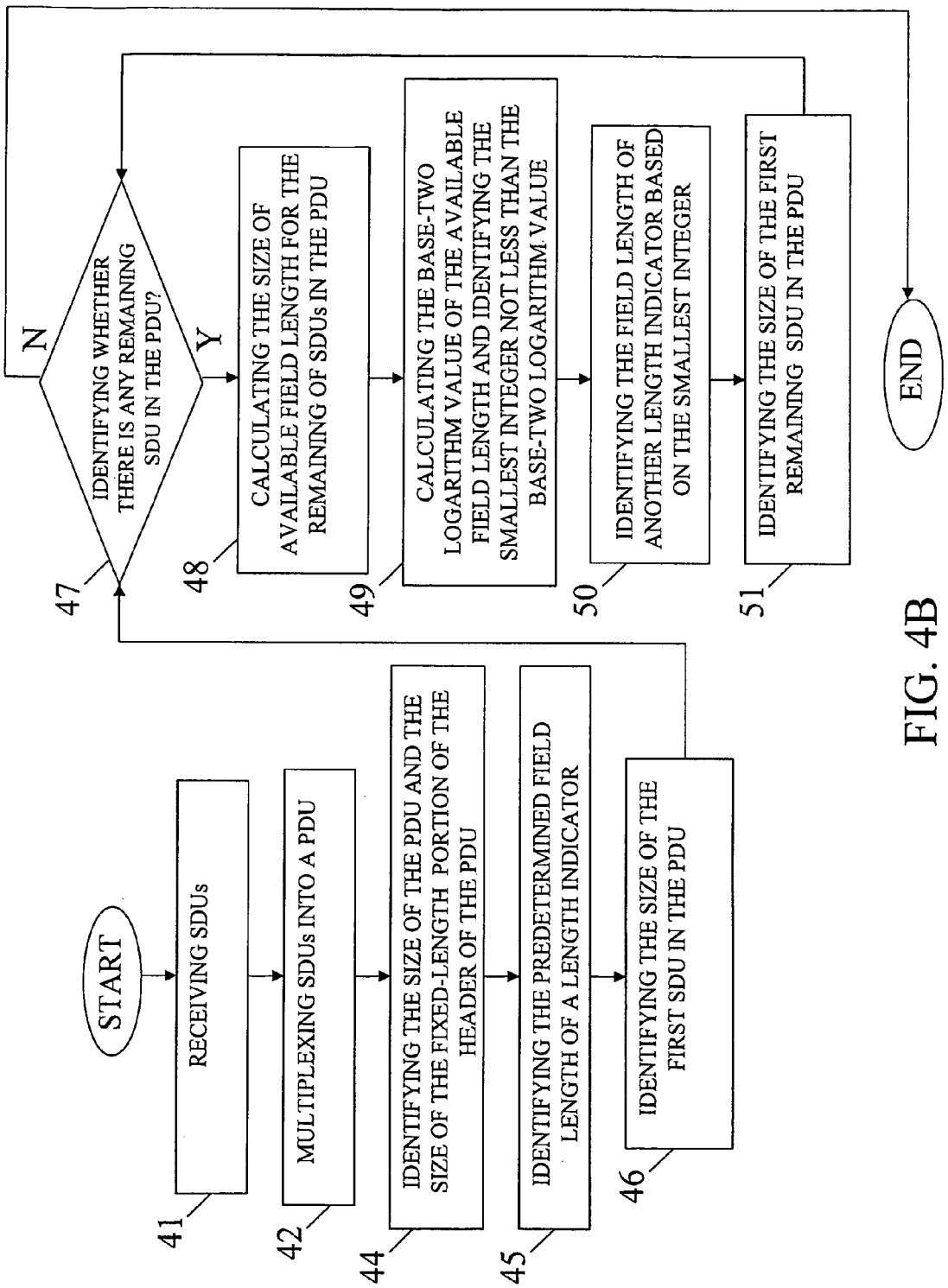
FIG. 4B is an exemplary flow chart illustrating another method of identifying the length(s) of length indicators, consistent with certain disclosed embodiments.

FIG. 4B is an exemplary flow chart illustrating another method of identifying the length(s) of length indicators, consistent with certain disclosed embodiments. Referring to FIG. 4B, the method may be similar to that illustrated in FIG. 4A. In one embodiment, step 43 may be omitted.

FIGS. 5A and 5B are exemplary diagrams illustrating field lengths identified by the methods illustrated in FIGS. 4A and 4B, respectively. In one embodiment, the PDU size "B" may be 1024 bytes, and the predetermined field length "M" may be 11 bits. Referring to FIG. 5A, according to the method of FIG. 4A, a number of SDUs may be reordered according to their sizes. The field length of a first length indicator for the first reordered PDUs may be determined by one of the values: $\lceil \log_2 1024 \rceil = 10$, M=11, min($\lceil \log_2(1024-FH) \rceil$, 11), and min ($\lceil \log_2 1024 \rceil$, 11). When the field length of the first length indicator is available, the value of the first length indicator at the transmitter side may be identified, i.e., 512, which is the size (512 bytes) of the SDU in the PDU. Next, the available field length "AFL$_1$" for the remaining PDUs may be calculated by subtracting the values of I$_1$ (10 bits) and V$_1$ (512 bytes). The field length of a second length indicator may be calculated by the ceiling function of the base-two logarithm value of the available field length "AF$_{L_1}$." When the field length of the second length indicator is available, the value of the second length indicator may be identified, i.e., 128, which is the size (128 bytes) of the second SDU in the PDU. Subsequently, the available field length "AFL$_2$" for the remaining at least one first PDU may be calculated by further subtracting the values of I$_2$ (8 bits) and V$_2$ (128 bytes). Similarly, the field lengths of the third and fourth length indicators and in turn the sizes of the third and fourth SDUs may be identified at a receiver side.

Referring to FIG. 5B, according to the method of FIG. 4B, the SDUs of the second PDU are not reordered. The field length of a first length indicator for the first one of the reordered PDUs may be determined by one of the values, $\lceil \log_2 1024 \rceil = 10$, M=11, min ($\lceil \log_2(1024-FH) \rceil$, 11) and min ($\lceil \log_2 1024 \rceil$, 11). When the field length of the first length indicator is available, the value of the first length indicator at the transmitter side may be identified, i.e., 128, which is the size (128 bytes) of the first SDU. Next, the available field length "AFL$_1$" for the remaining SDUs may be calculated by subtracting the values of I$_1$ (10 bits) and V$_1$ (128 bytes). The field length of a second length indicator may be calculated by the ceiling function of the base-two logarithm value of the available field length "AFL$_1$." When the field length of the second length indicator is available, the value of the second length indicator may be identified, i.e., 512, which is the size (512 bytes) of the second SDU in the PDU. Subsequently, the available field length "AFL$_2$" for the remaining SDUs may be calculated by further subtracting the values of I$_2$ (10 bits) and V$_2$ (512 bytes). Similarly, the field lengths of the third and fourth length indicators and in turn the sizes of the third and fourth SDUs may be identified at the receiver side.

Figure 6:
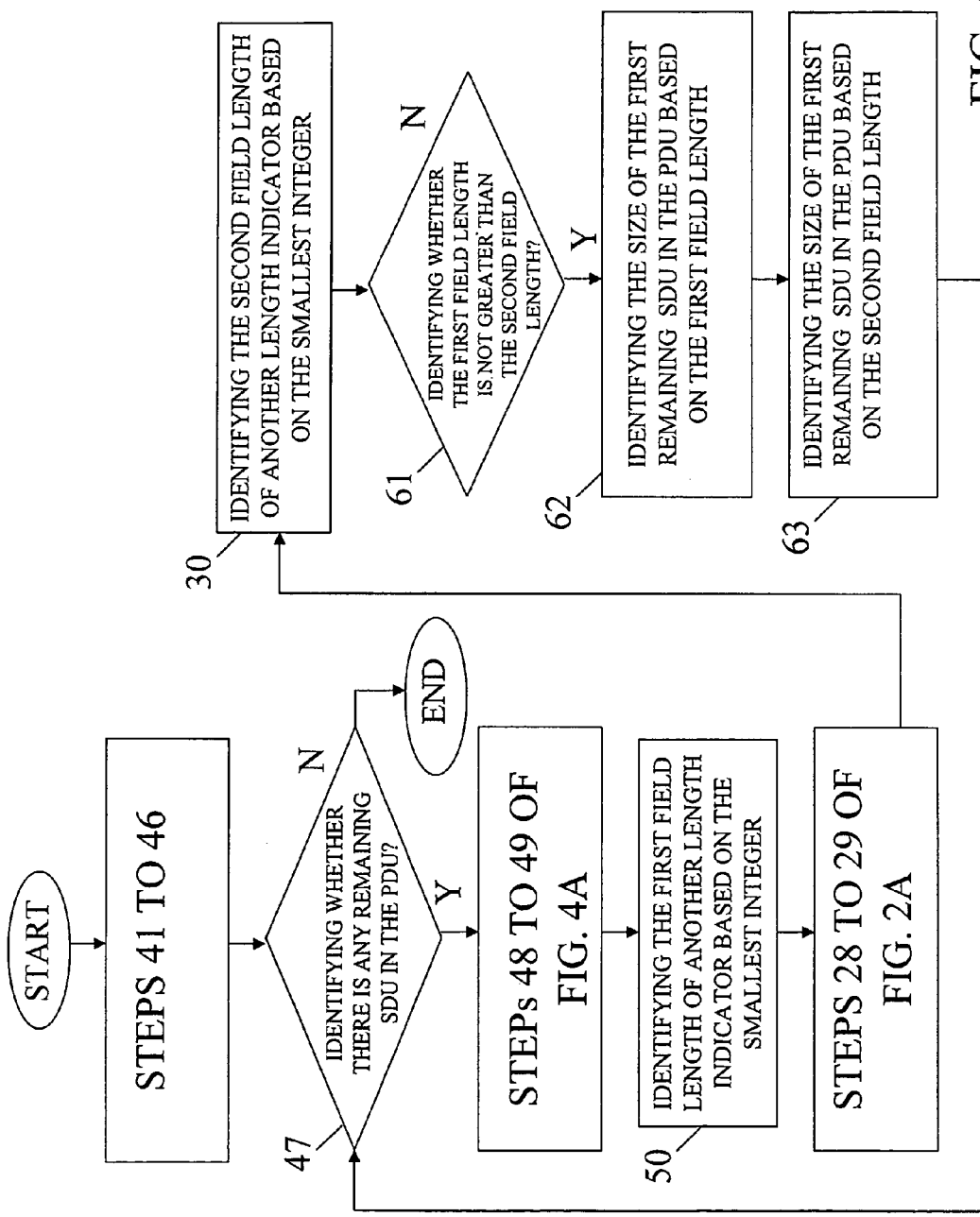
FIG. 6 is an exemplary flow chart illustrating another method of identifying the length of a length indicator, consistent with certain disclosed embodiments.

FIG. 6 is an exemplary flow chart illustrating another method of identifying the length of a length indicator, consistent with certain disclosed embodiments. Referring to FIG. 6, the method in one embodiment may include some of the steps illustrated in FIG. 2A and some of the steps illustrated in FIG. 4A. At step 61, a first field length identified at step 50 may be compared with a second field length identified at step 30. If the first field length is not greater than the second field length, the size of a first remaining SDU may be identified based on the first field length at step 62. If the first field length is greater than the second field length, the size of the first remaining SDU may be identified based on the second field length at step 63. The steps 47 to 50, 28 to 30 and 61 to 63 may be repeated until all of the SDUs in the PDU are identified in their sizes.

Figure 7A:
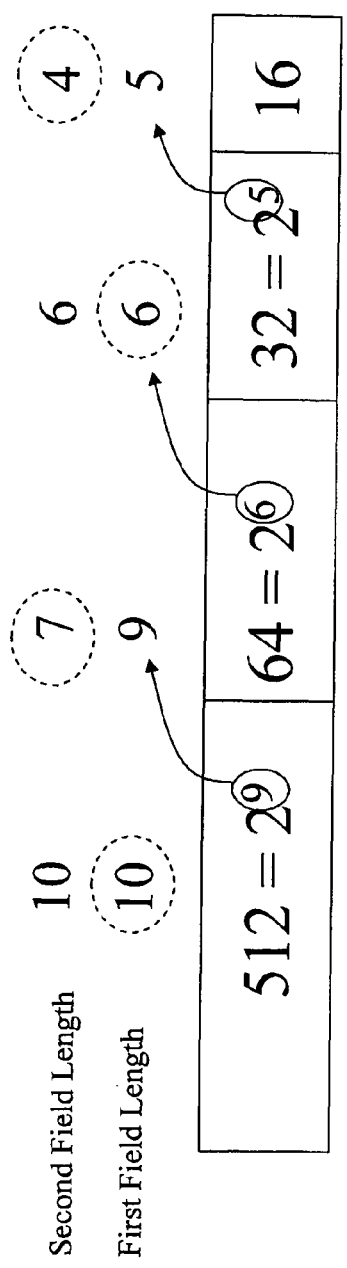
FIGS. 7A and 7B are exemplary diagrams illustrating examples of field lengths identified with several data units, consistent with certain disclosed embodiments.
Figure 7B:
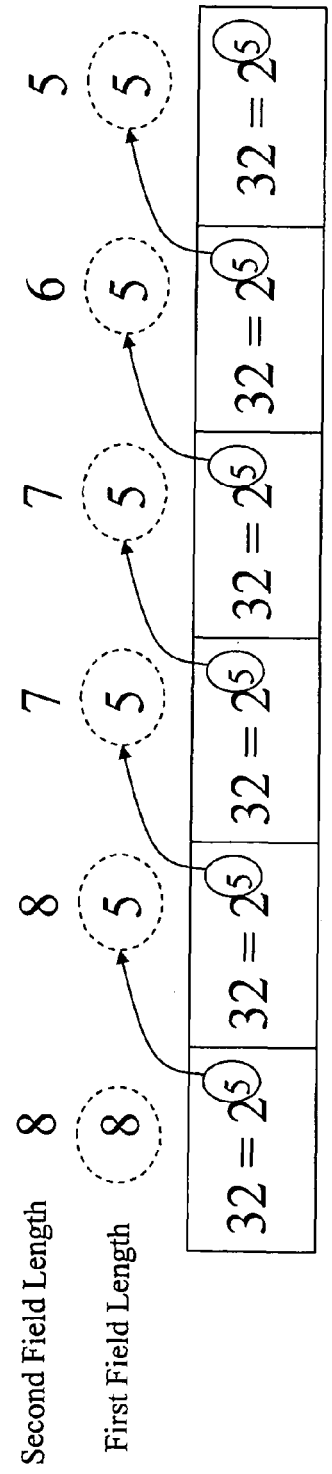

FIGS. 7A and 7B are exemplary diagrams illustrating examples of field lengths identified with several data units, consistent with certain disclosed embodiments. Referring to FIG. 7A, in one embodiment, a first set of field lengths for a reordered PDU based on the method illustrated in FIG. 2A may be 10, 9, 6 and 5 bits, while a second set of field lengths for the reordered PDU based on the method illustrated in FIG. 4A may be 10, 7, 6 and 4 bits, as shown in dashed circles. By applying the method illustrated in FIG. 6, a third set of field lengths for the reordered PDU may be 10, 7, 6 and 4 bits, as shown in dashed circles.

Referring to FIG. 7B, in another embodiment, a first set of field lengths for a reordered PDU based on the method illustrated in FIG. 2A may be 8, 5, 5, 5, 5 and 5 bits, while a second set of field lengths for the reordered PDU based on the method illustrated in FIG. 4A are 8, 8, 7, 7, 6 and 5 bits. By applying the method illustrated in FIG. 6, a third set of field lengths for the reordered PDU may be 8, 5, 5, 5, 5 and 5 bits, as shown in dashed circles.

Figure 8A:
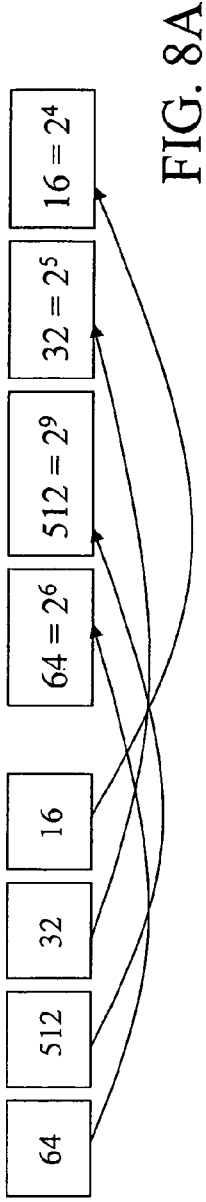
Figure 8B:
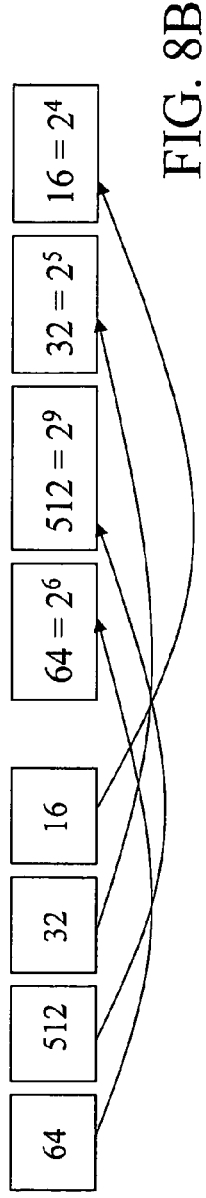

FIGS. 8A to 8E are exemplary diagrams illustrating a comparison example between a conventional design and various designs consistent with certain disclosed embodiments. The exemplary comparison assumes a having a PDU of 1024 bytes ("B") and a predetermined field length of 8 bits ("M"). Referring to FIG. 8A, in a conventional technique based on $I_i$=M previously described in the background, the field lengths for SDUs of 64, 512, 32 and 16 bytes are 11, 11, 11 and 11 bits, respectively, resulting in a total number of 44 bits required for length indicators. Referring to FIG. 8B, in a conventional technique based on $I_i = \lceil \log_2 B \rceil$ previously described in the background, the field lengths for the same SDUs are 10, 10, 10 and 10 bits, resulting in a total number of 40 bits required for length indicators.

Figure 8C:
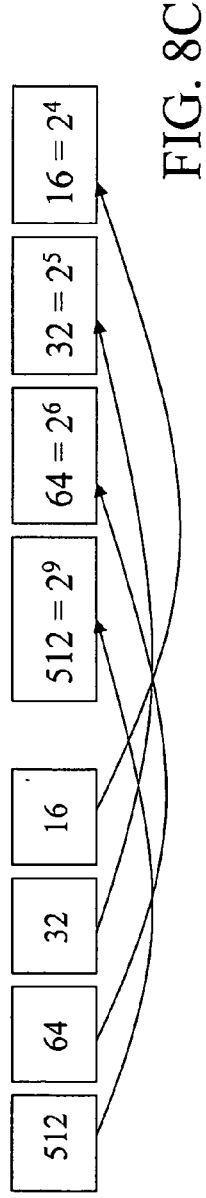

Referring to FIG. 8C, under the exemplary method illustrated in FIG. 2A, the field lengths for the same SDUs are 10, 9, 6 and 5 bits, resulting in a total number of 30 bits in one embodiment. Referring to FIG. 8D, under the exemplary method illustrated in FIG. 4A, the field lengths for the same SDUs are 10, 10, 6 and 4 bits, resulting in a total number of 30 bits required for length indicators in one embodiment. Referring to FIG. 8E, under the exemplary method illustrated in FIG. 6 or FIG. 7A, the field lengths for the same SDUs are 10, 7, 6 and 4 bits, resulting in a total number of 27 bits required for length indicators in one embodiment.

Accordingly, in the exemplary comparisons, the exemplary methods consistent with some embodiments may use fewer bits for the length indicators. Using less transmission resources in some embodiments may leave more space or resource for the transmission of other information or data and may reduce the overhead of wireless communication systems.

Embodiments described may be implemented in various ways or applications. For example, a wireless communication device may be implemented with flexible length indicators. Consistent with what is described above, the wireless communication device may include a data receiving interface, a data processing device coupled with the data receiving interface, and a processing device coupled with the data receiving interface. The data receiving interface is configured to receive a first sub-group and a second sub-group of data for transmission. The first sub-group of data includes data contents for providing at least a portion of a first service, and the second sub-group of data includes data contents for providing at least a portion of a second service. The data processing device is configured to combine the first sub-group of data and the second sub-group of data as a portion of a data transmission group. The processing device is configured to provide the size of a first length indicator based at least on the size of the data transmission group. The first length indicator is configured to indicate the size of the first sub-group of data. The processing device is also configured to provide the size of a second length indicator based on one or more of (a) the size of the first length indicator; (b) the size of the first sub-group of data; (c) the size of a sub-group having the largest data size; (d) the size of the data transmission group; and (e) the size of a header section. The second length indicator is configured to indicate the size of the second sub-group of data.

Alternatively, flexible length indicators may be implemented through a set of instructions recognizable by a wireless communication device. In one embodiment, the instructions may be processed by the device to perform, in no particular order, the steps of: (a) receiving a first sub-group of data for transmission, the first sub-group of data including data contents for providing at least a portion of a first service; (b) receiving a second sub-group of data for transmission, the second sub-group of data including data contents for providing at least a portion of a second service; (c) combining the first sub-group of data and the second sub-group of data as a portion of a data transmission group; (d) providing the size of a first length indicator based at least on the size of the data transmission group, the first length indicator being configured to indicate the size of the first sub-group of data; and (e) providing the size of a second length indicator based on one or more of (1) the size of the first length indicator; (2) the size of the first sub-group of data; (3) the size of a sub-group having the largest data size; (4) the size of the data transmission group; and (5) the size of a header section, the second length indicator being configured to indicate the size of the second sub-group of data.

Furthermore, flexible length indicators may be implemented through a method, such as a method of operating a wireless device. In one embodiment, the method may include, in no particular order, the steps of: (a) receiving at least two sub-groups of data for transmission, the at least two sub-groups of data including data contents for providing at least portions of data for at least a first service and a second service; (b) combining the at least two sub-groups of data as a portion of the data transmission group; (c) providing the size of a first length indicator based at least on the size of the data transmission group, the first length indicator being configured to indicate the size of a first sub-group of data; and (d) providing the size of a second length indicator based on one or more of (1) the size of the first length indicator; (2) the size of the first sub-group of data; (3) the size of a sub-group having the largest data size; (4) the size of the data transmission group; and (5) the size of a header section, the second length indicator being configured to indicate the size of a second sub-group of data.

As an example, the first and second services provided may include one or more of voice communication, video, data, text, e-mail, or audio services. In some embodiments, the wireless communication device itself or the device being implemented with the illustrated instructions or methods may be one or more of a user device, a mobile device, a cellular phone, a wireless transmission device, a wireless transmission station, and a portable computer.

In embodiments implementing a wireless communication device, the first sub-group of data may be larger in size than the second sub-group of data. In some devices, a data receiving interface may be configured to receive two or more sub-groups of data for transmission. The sub-groups of data may include data contents for providing at least portions of data for at least two services. A data processing device of a wireless communication device may be configured to combine the two or more sub-groups of data as a portion of the data transmission group. In one embodiment, a data processing device combines the first and second sub-groups of data by multiplexing data from the first and second sub-groups as the data transmission group. In one embodiment, the data processing device may be configured to reorder the sub-groups in an ascending order based on the sizes of the sub-groups.

In embodiments implementing a set of instructions recognizable by a wireless communication device, the instructions may be implemented in one or more of a user device, a mobile device, a cellular phone, a wireless transmission device, a wireless transmission station, and a portable computer. In some embodiments, the instructions may be capable of configuring the device to perform the step of receiving three or more sub-groups of data for transmission. The sub-groups of data may include data contents for providing at least portions of data for two or more services. The instructions may also be capable of configuring the device to perform the step of combining the sub-groups of data as a portion of a data transmission group. Similar to the device illustrated above, the instructions may be capable of configuring a device to reorder the sub-groups in an ascending order based on the sizes of the sub-groups.

In embodiments implementing methods of operating a wireless communication device, the method may be implemented in one or more of a user device, a mobile device, a cellular phone, a wireless transmission device, a wireless transmission station, and a portable computer. In some embodiments, the method may include providing the size of a third length indicator based on at least one of (a) the size of the second length indicator; (b) the size of the second sub-group of data; (c) the size of the data transmission group; and (d) the size of a header section. The third length indicator may be configured to indicate the size of a third sub-group of data. The method may also include reordering the at least two sub-groups in an ascending order based on the sizes of the at least two sub-groups.

In describing representative embodiments illustrated above, the specification may have presented the method in a particular sequence of steps. But to the extent that the method or process does not rely on the particular sequence illustrated, the method is not limited to the disclosed sequence and may be implemented with varied sequences.

It will be apparent to those skilled in the art that various modifications and variations can be made in the systems and methods disclosed. It is intended that the embodiments be considered as exemplary only, with the true scope of the disclosed embodiments being indicated by the following claims and their equivalents.

What is claimed is:

1. A wireless communication device comprising:
   a data receiving interface configured to receive a first sub-group and a second sub-group of data for transmission, the first sub-group of data comprising data contents for providing at least a portion of at least one communication service, and the second sub-group of data comprising data contents for providing another portion of the at least one communication service;
   a data processing device coupled with the data receiving interface and configured to combine the first sub-group of data and the second sub-group of data as a portion of a data transmission group;
   a processing device coupled with the data receiving interface and configured: (1) to reorder the sub-groups in a descending order based on sizes of the sub-groups; (2) to provide a size of a first length indicator based at least on a size of the data transmission group, the first length indicator being configured to indicate a size of a first re-ordered sub-group of data; and (3) to provide a size of a second length indicator based on at least one of (a) a size of the first length indicator; (b) a size of the first sub-group of data; (c) the size of the data transmission group; and (d) a size of a header section, the second length indicator being configured to indicate a size of a re-ordered second sub-group of data.

2. The wireless communication device of claim 1, wherein the first sub-group of data is a first service data unit (SDU), the second sub-group of data is a second service data unit (SDU), and the data transmission group is a protocol data unit (PDU).

3. The wireless communication device of claim 1, wherein the size of the first length indicator is based on one of $I_1 = \min(\lceil \log_2 B \rceil, M)$ or $I_1 = \min(\lceil \log_2(B-FH) \rceil, M)$, wherein $I_1$ represents a field length of the first length indicator, "B" represents the size of the data transmission group, M represents a predetermined field length, and $\lceil X \rceil$ represents a ceiling function of X and, for all real numbers X, the ceiling function returns the smallest integer not less than X, with $\lceil X \rceil = \min\{n \in Z | X \leq n\}$.

4. The wireless communication device of claim 1, wherein the size of the second length indicator and additional length indicators are calculated based on one of (1) $I_i = \lceil \log_2 V_{i-1} \rceil$, $$I_i = \lceil \log_2 AFL \rceil = \left\lceil \log_2 \left( B - \sum_{j=1}^{i-1}(I_j + V_j) - FH \right) \right\rceil, \quad (2)$$

and (3) the minimum value between (1) and (2), for $i \geq 2$, i being an integer, wherein $I_i$ represents a field length of an i-th length indicator, and "$V_{i-1}$" represents a size of a sub-group immediately before remaining sub-groups.

5. The wireless communication device of claim 1, wherein the wireless communication device is at least one of a user device, a mobile device, a cellular phone, a wireless transmission device, a wireless transmission station, and a portable computer.

6. The wireless communication device of claim 1, wherein the data receiving interface is further configured to receive at least three sub-groups of data for transmission, the sub-groups of data comprising data contents for providing the at least one communication service; and
   the data processing device is further configured to combine the at least three sub-groups of data as a portion of the data transmission group.

7. The wireless communication device of claim 1, wherein at least one of the first and second services comprises at least one of voice communication, video, data, text, e-mail, or audio services.

8. The wireless communication device of claim 1, wherein the data processing device combines the first and second re-ordered sub-groups of data by multiplexing data from the first and second sub-groups as the data transmission group.

9. A non-transitory storage medium readable by a computer and encoded with a set of instructions, the set of instructions being processed by the computer to perform steps comprising:
   receiving a first sub-group of data for transmission, the first sub-group of data comprising data contents for providing at least one communication service;
   receiving a second sub-group of data for transmission, the second sub-group of data comprising data contents for providing the at least one communication service;
   reordering the sub-groups in a descending order based on sizes of the sub-groups;
   combining the first re-ordered sub-group of data and the second re-ordered sub-group of data as a portion of a data transmission group;
   providing a size of a first length indicator based at least on a size of the data transmission group, the first length indicator being configured to indicate a size of the first re-ordered sub-group of data; and
   providing a size of a second length indicator based on at least one of (1) a size of the first length indicator; (2) a size of the first sub-group of data; (3) the size of the data transmission group; and (4) a size of a header section, the second length indicator being configured to indicate a size of the second re-ordered sub-group of data.

10. The non-transitory storage medium of claim 9, wherein the first sub-group of data is a first service data unit (SDU), the second sub-group of data is a second service data unit (SDU), and the data transmission group is a protocol data unit (PDU).

11. The non-transitory storage medium of claim 9, wherein the size of the first length indicator is based on one of $I_i=\min(\lceil\log_2 B\rceil, M)$ or $I_i=\min(\lceil\log_2(B-FH)\rceil, M)$, wherein $I_1$ represents a field length of the first length indicator, "B" represents the size of the data transmission group, M represents a predetermined field length, and $\lceil X\rceil$ represents a ceiling function of X and, for all real numbers X, the ceiling function returns the smallest integer not less than X, with $\lceil X\rceil=\min\{n\epsilon Z|X\leq n\}$.

12. The non-transitory storage medium of claim 9, wherein the size of the second length indicator and additional length indicators are calculated based on one of (1) $I_i=\lceil\log_2 V_{i-1}\rceil$, $$I_i = \lceil\log_2 AFL\rceil = \left\lceil\log_2\left(B-\sum_{j=1}^{i-1}(I_j+V_j)-FH\right)\right\rceil, \quad (2)$$

and (3) the minimum value between (1) and (2), for $i\geq 2$, i being an integer, wherein $I_i$ represents a field length of an i-th length indicator, and "$V_{i-1}$" represents a size of a sub-group immediately before remaining sub-groups.

13. The non-transitory storage medium of claim 9, wherein the computer is at least one of a user device, a mobile device, a cellular phone, a wireless transmission device, a wireless transmission station, and a portable computer.

14. The non-transitory storage medium of claim 9, wherein the instructions are capable of configuring the computer to perform operations comprising:
receiving at least three sub-groups of data for transmission, the at least three sub-groups of data comprising data contents for providing at least one communication service;
combining the at least three sub-groups of data as a portion of the data transmission group.

15. The non-transitory storage medium of claim 9, wherein at least one of the first and second services comprises at least one of voice communication, video, data, text, e-mail, or audio services.

16. The non-transitory storage medium of claim 9, wherein combining the first sub-group of data and the second sub-group of data as a portion of a data transmission group comprises multiplexing data from the first and second sub-groups as the data transmission group.

17. A method of operating a wireless communication device, the method comprising:
receiving, using a data receiving interface, at least two sub-groups of data for transmission, the at least two sub-groups of data comprising data contents for providing at least portions of data for at least a first service and a second service;
combining, using a data processing device, the at least two sub-groups of data as a portion of the data transmission group;
providing, using a processing device, a size of a first length indicator based at least on a size of the data transmission group, the first length indicator being configured to indicate a size of a first sub-group of data; and
providing, using the processing device, a size of a second length indicator based on at least one of (1) a size of the first length indicator; (2) a size of the first sub-group of data; (3) the size of the data transmission group; and (4) a size of a header section, the second length indicator being configured to indicate a size of a second sub-group of data.

18. The method of claim 17, wherein the first sub-group of data is a first service data unit (SDU), the second sub-group of data is a second service data unit (SDU), and the data transmission group is a protocol data unit (PDU).

19. The method of claim 17, wherein the size of the first length indicator is based on one of $I_1=\min(\lceil\log_2 B\rceil, M)$ or $I_1=\min(\lceil\log_2(B-FH)\rceil, M)$, wherein $I_1$ represents a field length of the first length indicator, "B" represents the size of the data transmission group, M represents a predetermined field length, and $\lceil X\rceil$ represents a ceiling function of X and, for all real numbers X, the ceiling function returns the smallest integer not less than X, with $\lceil X\rceil=\min\{n\epsilon Z|X\leq n\}$.

20. The method of claim 17, wherein the size of the second length indicator and additional length indicators are calculated based on one of (1) $I_i=\lceil\log_2 V_{i-1}\rceil$, $$I_i = \lceil\log_2 AFL\rceil = \left\lceil\log_2\left(B-\sum_{j=1}^{i-1}(I_j+V_j)-FH\right)\right\rceil, \quad (2)$$

and (3) the minimum value between (1) and (2), for $i\geq 2$, i being an integer, wherein $I_i$ represents a field length of an i-th length indicator, and "$V_{i-1}$" represents a size of a sub-group immediately before remaining sub-groups.

21. The method of claim 17, wherein the methods are implemented in at least one of a user device, a mobile device, a cellular phone, a wireless transmission device, a wireless transmission station, and a portable computer.

22. The method of claim 17, wherein the first sub-group of data is larger in size than the second sub-group of data.

23. The method of claim 17 further comprising: providing a size of a third length indicator based on at least one of (1) the size of the second length indicator; (2) a size of the second sub-group of data; (3) the size of the data transmission group; and (4) the size of a header section, the third length indicator being configured to indicate a size of a third sub-group of data.

24. The method of claim 17 further comprising reordering the at least two sub-groups in a descending order based on the sizes of the at least two sub-groups.

25. The method of claim 17, wherein at least one of the first and second services comprises at least one of voice communication, video, data, text, e-mail, or audio services.

26. The method of claim 17, wherein combining the at least two sub-groups of data comprises multiplexing data from the at least two sub-groups as the data transmission group.

* * * * *